United States Patent [19]

Pannhorst et al.

[11] Patent Number: 5,212,122
[45] Date of Patent: * May 18, 1993

[54] TRANSPARENT COLORED GLASS CERAMIC WITH GOOD THERMAL STABILITY AND VARIABLE TRANSMISSION IN THE IR REGION

[75] Inventors: Wolfgang Pannhorst; Erich Rodek; Herwig Scheidler, all of Mainz, Fed. Rep. of Germany

[73] Assignee: Schott Glaswerke, Mainz, Fed. Rep. of Germany

[ * ] Notice: The portion of the term of this patent subsequent to Oct. 18, 2005 has been disclaimed.

[21] Appl. No.: 923,113

[22] Filed: Oct. 24, 1986

[30] Foreign Application Priority Data

Oct. 26, 1985 [EP] European Pat. Off. ........ 85113664.8

[51] Int. Cl.$^5$ .............................................. C03C 3/085
[52] U.S. Cl. ........................................ 501/69; 501/64; 501/70; 501/71
[58] Field of Search .................. 501/68, 69, 4, 6, 7, 501/70, 71, 72

[56] References Cited

U.S. PATENT DOCUMENTS

| | | | |
|---|---|---|---|
| 3,788,865 | 6/1965 | Babcock et al. | 501/69 X |
| 4,009,042 | 2/1977 | Rittler | 501/68 |
| 4,192,688 | 3/1980 | Babcock et al. | 501/69 X |
| 4,285,728 | 8/1981 | Babcock et al. | 501/69 X |
| 4,461,839 | 7/1984 | Rittler | 501/69 X |

FOREIGN PATENT DOCUMENTS

| | | | |
|---|---|---|---|
| 0792814 | 8/1968 | Canada | 501/68 |
| 2545475 | 11/1984 | France | 501/69 |
| 0004870 | 2/1970 | Japan | 501/68 |
| 0001639 | 1/1972 | Japan | 501/69 |
| 0126712 | 12/1974 | Japan | 501/68 |

Primary Examiner—Karl Group
Assistant Examiner—Chris Gallo
Attorney, Agent, or Firm—Wegner, Cantor, Mueller & Player

[57] ABSTRACT

A transparent, colored glass ceramic containing high-quartz solid solution crystals, whose transmission in the IR range between 800 nm and 2.6 microns can be variably adjusted, and which has the composition (in weight percent) of 62–68% $SiO_2$, 19.5–22.5% $Al_2O_3$, 3.0–4.0 $Li_2O$, 1.5–3.5% $BaO$, 0.5–2.5% $ZnO$ and 1.5–5.0% $TiO_2$ in addition to other possible oxides, which are present in small quantities, the color being produced by $MnO_2$, $Fe_2O_3$, $CoO$, $NiO$, $V_2O_5$ and $Cr_2O_3$.

This glass ceramic is transformed from the starting glass by a heat treatment between 680° C. and 920° C.

13 Claims, No Drawings

TRANSPARENT COLORED GLASS CERAMIC WITH GOOD THERMAL STABILITY AND VARIABLE TRANSMISSION IN THE IR REGION

DESCRIPTION OF THE INVENTION

1. Technical Field of the Invention

This invention relates to a glass ceramic which appears black in reflection and violet or brown to dark red in transmission, has a variably adjustable transmission in the IR region from 0.8 to 2.6 microns and is suitable for the manufacture of heatable plates.

2. Background Art

Glass ceramics which are transparent in the visible wavelength region and which are used as heatable plates are known and commercially available. All these plates are based on glass ceramics containing high-quartz solid solution crystals and are tinted by means of coloring oxides such as $TiO_2$, $MnO_2$, $Fe_2O_3$, NiO, CoO, $Cr_2O_3$, $V_2O_5$ and CuO; $TiO_2$ is invariably used because of its nucleating action. The influence of these coloring oxides on coloration, i.e., on absorption in the visible wavelength region, has been studied thoroughly. For example, the influence of CoO, $Cr_2O_3$, NiO and $Fe_2O_3$ separately and of CoO in combination with $MnO_2$ and CuO on the transmission in the visible wavelength region is described in Federal Republic of Germany Laid-Open Application 15 96 858.

In U.S. Pat. No. 3,788,865, the effect of combinations of each oxide pair available from CoO, NiO, $Fe_2O_3$, $Cr_2O_3$, $MnO_2$ and CuO on light transmission in the wavelength region from 400 to 700 nm is studied; in addition, the effect of the three oxides NiO, CoO and $Fe_2O_3$ together as well as that of $V_2O_5$ on the transmission is described; the $V_2O_5$-containing glass ceramic is said to have good transparency in the IR region, although no measured results are presented.

In Federal Republic of Germany Patent 24 29 563, the joint effect of the four oxides CoO, NiO, $Fe_2O_3$ and $MnO_2$ on light transmission is described; a transmission of over 70%, which is the deciding factor for the transmitted hue, is observed in the wavelength region from 700 to 800 nm, whereas the IR transmission sometimes decreases to less than 10%.

In U.S. Pat. No. 4,285,728 the effect of the coloring oxides CoO, NiO, $Cr_2O_3$, $Fe_2O_3$, MnO, CuO and $V_2O_5$ on the light transmission in the wavelength region from 400 to 700 nm in the base glass and in the associated glass ceramic is studied; in addition, the joint effect of pairs or triples of these oxides on the light transmission is described. Data on the transmission in the IR region are not presented.

Finally, in U.S. Pat. No. 4,211,820, a brown glass ceramic is described in which the tint is produced by $V_2O_5$ in addition to $TiO_2$; the only other coloring oxide present is $Fe_2O_3$ in low concentrations. The transmission is not sufficiently characterized, and it can only be assumed that the brown color ought to be characterized by measurements of the transmission at lambda=800 nm on 5-mm-thick specimens. Data on the transmission in the IR region are not presented.

As follows from the above teachings of the prior art, the influence of coloring oxides on the transmission in the visible region of glass ceramics containing high-quartz solid solution crystals, has been thoroughly studied, even through some of the documentation of the results is meager. Thus, it is possible to manufacture heatable plates with a thickness of around 4 mm which appear untransparent (black) in reflection but violet or brown to dark red in transmission. When used as cooktop panels, sometimes also called cooking surfaces or range tops, or in similar applications, the heating elements can be readily seen during operation but in the off-condition are concealed by the cooktop panel.

In contrast to the transmission in the visible wavelength region, the influence of the coloring oxides on the transmission in the IR region has been studied only very incompletely. As regards the commercially available glass-ceramic cooktop panels of the Corning Co., Corning Code 9632, it is known that this glass ceramic tinted with $V_2O_5$ has a very high transmission in the IR region from 1 to 2.6 microns, i.e., around 80% for 4 mm thick specimens; conversely the glass-ceramic cooktop panels sold under the name CERAN, Code No. 855 73, by the Schott Co., which are tinted with a combination of the oxides CoO, NiO, $MnO_2$ and $Fe_2O_3$, have very low IR transmission which, for 4 mm thick specimens, is less than 10% at a wavelength of 1.6 microns.

Examination of heatable plates for the particular application of cooktop panels reveals that the IR transmission is not the sole determining factor for high efficiency of the cooking system, i.e., for short boiling times and low energy consumption. It has already been shown in Federal Republic of Germany Patent 24 37 026 that heating elements (with temperature limiter), cooktop panel and cooking utensils must be considered jointly as a unit.

For a given heating element and given cooktop panel, a determining factor for the heat flow from the heat source to the food to be cooked is the quality of the pot bottom, i.e., its absorption and reflection properties, its planarity and its movement perpendicular to the heat source during the cooking process. The less the pot absorbs the available energy (and vice versa), the more the energy is returned to the heating element, until the temperature limiter set at a specified required temperature switches off.

The proportion of energy transferred by radiation from the heating element through the cooktop panel to the pot bottom depends on the transmission property of the cooktop panel. In addition the pot bottom is heated by heat conduction and secondary radiation of the cooktop panel as it heats up. Moreover, in the case of reflecting pot bottoms, reverse energy transport occurs as a function of the transmission of the cooktop panel.

In both Federal Republic of Germany Patent 24 37 026 and in Schott-Information 2/84 it was demonstrated that optimization of such a cooking system is very difficult, especially because of the different pot qualities, and cannot be achieved solely by changing the IR transmission of the cooktop panel. For example, depending on the radiation intensity of the heating element, excessive IR transmission can be positively harmful if the movement of the pot bottom is deleteriously affected or if too much of the energy not absorbed by the pot is reflected back through the cooktop panel, with the result that the temperature limiter switches off too frequently during the boil up time.

In order largely to eliminate the dependence on the pot subsystem in the efficiency of the overall system of heating element, cooktop panel and pot, it was therefore suggested in Federal Republic of Germany Patent 24 37 026 that the glass-ceramic plate be coated on the top side with a radiation-absorbing enamel layer. Alternatively it is also possible to selectively adjust the optimum absorption of the heat radiation by coloring oxides. This has the advantage that enamels can then be used solely for decorative purposes and that they can be chosen much more freely.

At present, the development of heating elements for glass ceramic cooktop panels can in no way be considered as being complete. In the future, heating systems can definitely be anticipated which have a radiation characteristic different from that of current heating elements for cooktop panels and/or which are made up of serveral heating element types with different radiation temperatures and characteristics.

These heating systems, which are not yet developed in all detail, ought to be taken into consideration in the development of an optimized cooktop panel. Moreover, it would be advantageous to be able to adjust the radiation transmission in the visible and IR regions in order to achieve similar or equal transmission characteristics for different thicknesses of the heitible plates, as may be necessary, for example, for manufacturing reasons.

In order to achieve variability of the transmission in the IR region, the combinations of coloring oxides used heretofore must be expanded, since otherwise a heavy absorption in the visible region up to around 600 nm and a variable absorption in the IR region cannot be achieved simultaneously. Of the two coloring oxides which in glass ceramics containing high-quartz solid solution crystals absorb strongly up to around 600 nm and are very transparent from around 1000 nm, $Cr_2O_3$ can be used only in very low concentrations, since it greatly raises the upper devitrification temperature and the associated glasses cannot be processed.

Only combinations of $V_2O_5$ with other coloring oxides remain to solve the task posed; in this connection, compositions containing only $V_2O_5$ could be used for applications with high IR transmission, while compositions with lower IR transmission could be prepared by the addition of other coloring oxides such as NiO, CoO and $Fe_2O_3$.

Two difficulties occur, however. The vanadium forms several oxides of different valences, and transitions from one oxidation state to another can be caused by only a slight shift of the reduction-oxidation conditions. Thus, in combinations of $V_2O_5$ with other polyvalent cations, a change in the vanadium valence and thereby a color change is to be expected even in the case of small changes in the reduction-oxidation condition. Moreover, studies with $V_2O_5$-containing glass ceramics show that $V_2O_5$ has a deleterious effect on the stability of the high-quartz solid solution crystals. For example, U.S. Pat. No. 4,221,820 recites the fact that $V_2O_5$ appears to accelerate the transformation of the high-quartz solid solution phase to the keatite solid solution phase (also known as high-spodumene solid solution phase), although this was not considered to be negative. In the article of Pannhorst and Wichelhaus (Glastechn. Ber., 56K (1983), Vol. 1, pp. 572–577), it is also shown that $V_2O_5$ as well as a combination of the coloring oxides of NiO, CoO and $Fe_2O_3$, accelerate the transformation in comparison to the uncolored glass ceramic.

The transformation of the high-quartz solid solution crystals to keatite solid solution crystals is accompanied by an increase in the linear thermal expansion coefficient and by a change in the color. Since changes in the linear thermal expansion coefficient and in the color during use can be tolerated only within very narrow limits, the earlier onset of transformation of the glass ceramic containing a high-quartz solid solution phase into a glass ceramic containing a keatite solid solution phase means that the application of $V_2O_5$-containing compositions as cooktop panels can be impaired.

The stability relative to the above-mentioned transformation can be specified in various ways; in Federal Republic of Germany Patent 24 29 563, a specified heat treatment program was run several times, and the variation of the linear thermal expansion coefficient between 20° C. and 700° C., $\alpha_{20/700}$, was determined as a function of the number of heat treatment cycles. Another criterion is indicated in Schott-Information 2/84; according to this, the glass ceramic ought to withstand a temperature-time treatment at 825° C. for 35 hr without notable changes in properties.

DISCLOSURE OF THE INVENTION

Accordingly, it is a general object of the present invention to provide base glass compositions for the formation of glass ceramics; these glass ceramics having a light transmission pattern in the visible region such that with the heating elements switched on, even at low power, the heating elements are visible but the eyes are not dazzled and, in particular, are protected from harmful radiations, and that, with the heating elements switched off, they are concealed by the plate, which appears black in reflection.

Another object of the present invention is to provide base glass compositions for the formation of glass ceramics wherein, in the IR region, the transmission for the glass ceramic can be variably adjusted by means of different contents of coloring oxides such that optimization of various particular different overall heating system of heating element, cooktop panel and pot is possible.

A further object of the present invention is to provide base glass compositions for the formation of glass ceramics containing high-quartz solid solution crystals, which has sufficient stability with respect to extreme temperature/time treatments, as to have to be considered in the application as cooktop panels.

Upon study of the specification and appended claims, further objects, features and advantages of the present invention will become more fully apparent to those skilled in the art to which this invention pertains.

BEST MODE FOR CARRYING OUT THE INVENTION

Briefly, the above and other objects, features and advantages of the present invention are attained in one aspect thereof by providing a transparent, colored glass ceramic containing high-quartz solid solution crystals, whose transmission in the IR range between 800 nm and 2.6 microns can be variably adjusted, and which has the composition (in weight percent) of 62–68% $SiO_2$, 19.5–22.5% $Al_2O_3$, 3.0–4.0% $LiO_2$, 1.5–3.5% BaO, 0.5–2.5% ZnO and 1.5–5.0% $TiO_2$ in addition to other possible oxides, which are present in small quantities, the color being produced by $MnO_2$, $Fe_2O_3$, CoO, NiO, $V_2O_5$ and $Cr_2O_3$. This glass ceramic is transformed from the base glass by a heat treatment between 680° C. and 920° C.

DETAILED DESCRIPTION

Surprisingly, it became possible to find a composition range for base glasses so that variable tinting of the associated glass ceramic is possible by combinations of the oxides $V_2O_5$, NiO, CoO, $MnO_2$ and $Fe_2O_3$. The compositions of the invention lie in the following range:

|  | USEFUL | PREFERRED |
|---|---|---|
| $SiO_2$ | 62–68 | 64–66 |
| $Al_2O_3$ | 19.5–22.5 | 21–22 |
| $Li_2O$ | 3.0–4.0 | 3.4–3.8 |
| $Na_2O$ | 0.0–1.0 | 0.6–0.8 |
| $K_2O$ | 0.0–1.0 | 0.0–0.3 |
| $Na_2O + K_2O$ | 0.5–1.5 | 0.7–1.1 |
| BaO | 1.5–3.5 | 2.0–2.8 |
| CaO | 0.0–1.0 | 0.0–0.2 |
| BaO + CaO | 1.5–4.0 | 2.0–3.0 |
| MgO | 0.0–0.5 | 0.0–0.2 |
| ZnO | 0.5–2.5 | 1.0–1.6 |
| $TiO_2$ | 1.5–5.0 | 2.0–2.8 |
| $ZrO_2$ | 0.0–3.0 | 1.0–1.8 |
| $TiO_2 + ZrO_2$ | 3.5–5.5 | 3.5–4.6 |
| $MnO_2$ | 0.0–0.40 | 0.0–0.15 |
| $Fe_2O_3$ | 0.0–0.20 | 0.0–0.15 |
| CoO | 0.0–0.30 | 0.0–0.30 |
| NiO | 0.0–0.30 | 0.0–0.30 |
| $V_2O_5$ | 0.0–0.80 | 0.0–0.60 |
| $Cr_2O_3$ | 0.0–0.20 |  |
| F | 0.0–0.20 |  |
| $Sb_2O_3$ | 0.0–2.0 | 0.8–1.6 |
| $As_2O_3$ | 0.0–2.0 | 0.8–1.6 |
| $Sb_2O_3 + As_2O_3$ | 0.5–2.5 |  |

The data on the composition range refer to the analytical compositions of the glass-ceramic base glasses. However, the data are not intended to provide any indication of the valences of these oxides in the glass-ceramic base glasses or in the glass ceramics.

Compositions of the glass-ceramic base glasses and some properties of the associated glass ceramics are listed for some practical embodiments in Tables 1 and 2. Using raw materials which are standard in the glass industry, the base glasses were fused by melting at 1620° C. in ½-liter quartzware crucibles, fining at 1620° C. for 2 hr and homogenizing at around 1550° C. for 3 hr in Pt crucibles; castings of around 120×80×20 mm were then prepared and, starting from around 660° C., cooled to room temperature in an annealing furnace. To study the glass-ceramic properties, specimens were heated at 4° C./min to 720° C., kept at 720° C. for one hour, heated at 2° C./min to 880° C., kept at 880° C. for 90 min and finally cooled to room temperature by switching off the furnance.

Without further elaboration, it is believed that one skilled in the art can, using the preceding description, utilize the present invention to its fullest extent. The following preferred specific embodoments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

The low linear thermal expansion coefficients of the examples show that all compositions were chosen such that, in terms of resistance to thermal shock, they can be used as heatable plates and cooktop panels. The compositions of Examples 1 and 2 lie outside the composition range of the present invention, while Examples 3 to 8 illustrate the invention.

Example 1 lies within the composition range of Federal Republic of Germany Patent 24 29 563, and corresponds to a glass ceramic which is sold commercially for use as cooktop panels. This glass ceramic has proven effective when used with standard radiation heating elements, but as regards the development of relatively powerful heating elements there is room for improvement in the long-term stability of this glass ceramic; the changes in the linear thermal expansion coefficient, $\alpha_{20/700}$, and in the transmission after either the four heat treatment cycles with the above described heat treatment program or by post-tempering at 825° C. for 35 hr reveal that the longtime stability of this glass ceramic is not sufficient with respect to the objectives of the present invention.

Example 2 also corresponds to a commercially sold glass ceramic; our tests have shown that this glass ceramic encountered considerable problems as regards color constancy and constancy of the linear thermal expansion coefficient under conditions of long-term time/temperature treatments. This is confirmed by the results shown in Table 2; both after four heat treatment cycles and after tempering at 825° C. for 35 hr, the values of $\alpha_{20/700}$ and the transmission have changed considerably.

In contrast, Examples 3 to 8 exhibit good constancy of the linear thermal expansion coefficient and also a smaller change in transmission after four heat treatment cycles and after additional tempering. In addition, these examples show that the transmission at a wavelength of 1600 nm is variably adjustable; thus the IR transmission increases steadily in the series of examples, from 7% for Example 3 to 80% for Example 8.

TABLE 1

| Oxides | 1 | 2 | 3 | 4 | 5 | 6 | 7 | 8 |
|---|---|---|---|---|---|---|---|---|
| $SiO_2$ | 64.00 | 67.80 | 64.50 | 65.20 | 65.40 | 64.90 | 65.30 | 65.00 |
| $Al_2O_3$ | 21.30 | 20.10 | 21.40 | 21.20 | 21.10 | 21.80 | 21.20 | 21.40 |
| $Li_2O$ | 3.50 | 3.35 | 3.60 | 3.70 | 3.50 | 3.50 | 3.70 | 3.60 |
| $Na_2O$ | 0.60 | 0.30 | 0.60 | 0.60 | 0.80 | 0.75 | 0.60 | 0.70 |
| $K_2O$ | 0.50 | 0.20 | 0.15 | 0.20 | 0.25 | 0.05 | 0.20 | 0.25 |
| BaO | 2.50 | — | 2.30 | 2.30 | 2.35 | 2.40 | 2.30 | 2.35 |
| MgO | — | 1.58 | — | — | — | — | — | — |
| ZnO | 1.50 | 1.30 | 1.20 | 1.50 | 1.30 | 1.20 | 1.45 | 1.30 |
| $TiO_2$ | 2.30 | 4.90 | 2.30 | 2.30 | 2.25 | 2.40 | 2.30 | 2.20 |
| $ZrO_2$ | 1.60 | — | 1.60 | 1.45 | 1.58 | 1.60 | 1.45 | 1.60 |
| $MnO_2$ | 0.65 | — | 0.17 | 0.15 | 0.08 | 0.08 | 0.03 | — |
| $Fe_2O_3$ | 0.23 | 0.03 | 0.18 | 0.09 | 0.04 | 0.06 | 0.05 | 0.03 |
| CoO | 0.37 | — | 0.23 | 0.12 | 0.07 | 0.07 | 0.05 | — |
| NiO | 0.06 | — | 0.29 | 0.15 | 0.10 | 0.09 | 0.04 | — |
| $V_2O_5$ | — | 0.10 | — | 0.15 | 0.45 | 0.25 | 0.30 | 0.40 |
| $Sb_2O_3$ | 0.85 | — | 1.50 | 1.00 | 1.00 | 1.10 | 1.00 | 1.20 |
| $As_2O_3$ | — | 0.36 | — | — | — | — | — | — |

TABLE 2

| Temperature/Time Treatment | Property | 1 | 2 | 3 | 4 | 5 | 6 | 7 | 8 |
|---|---|---|---|---|---|---|---|---|---|
| 1 Heat Treatment Cycle | $\alpha_{20/700} \times 10^{-7}/K$ | 0.5 | 4.7 | −1.3 | −1.2 | −1.0 | −2.7 | −2.0 | −2.3 |
|  | $T_{700}$ (%) 4 mm thickness | 44 | 21 | 53 | 40 | 21 | 35 | 33 | 27 |
|  | $T_{1600}$ (%) 4 mm thickness | 8 | 80 | 7 | 21 | 37 | 40 | 50 | 80 |
|  | Crystal Content* | HQS | HQS | HQS | HQS | HQS | HQS | HQS | HQS |
| 4 Heat Treatment Cycles | $\alpha_{20/700} \times 10^{-7}/K$ | 8.0 | 8.8 | −0.4 | −1.0 | 0.1 | −2.0 | −1.5 | −0.5 |
|  | $T_{700}$ (%) 4 mm thickness | 20 | 9 | 45 | 27 | 10 | 24 | 22 | 14 |
|  | $T_{1600}$ (%) 4 mm thickness | 8 | 70 | 7 | 21 | 37 | 40 | 50 | 77 |
|  | Crystal Content* | HQS KSS | HQS | HQS | HQS | HQS | HQS | HQS | HQS |
| 1 Heat Treatment Cycle + | $\alpha_{20/700} \times 10^{-7}/K$ | 2.4 | 11.3 | −1.1 | −0.8 | 0.0 | −2.1 | −1.3 | −0.7 |

TABLE 2-continued

| Temperature/Time Treatment | Property | 1 | 2 | 3 | 4 | 5 | 6 | 7 | 8 |
|---|---|---|---|---|---|---|---|---|---|
| 35 h 825° C. | $T_{700}$ (%) 4 mm thickness | 25 | 9 | 45 | 26 | 10 | 22 | 21 | 12 |
|  | $T_{1600}$ (%) 4 mm thickness | 8 | 75 | 7 | 21 | 37 | 40 | 50 | 75 |
|  | Crystal Content* | HQS KSS | KSS | HQS | HQS | HQS | HQS | HQS | HQS |

*HQS = High-quartz solid solution crystals
KSS = Keatite solid solution crystals The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

INDUSTRIAL APPLICABILITY

As can be seen from the present specification and examples, the present invention is industrially useful in providing compositions suitable for use in the manufacture of heatable glass ceramic plates.

What is claimed is:

1. A transparent, colored glass ceramic consisting essentially of high quartz solid solution crystals, especially suitable for the manufacture of heatable plates, wherein:
   a) the change in the linear thermal expansion coefficient has a positive value of not greater than $1.8 \times 10^{-7}/°K$. over one to four heat treatment cycles of i) heating from room temperature at 4° C./min to 720° C.; ii) maintaining the temperature at 720° C. for one hour, iii) heating at 2° C./min to 880° C., iv) maintaining the temperature at 880° C. for 90 min, and v) cooling to room temperature;
   b) the change in the linear thermal expansion coefficient after one heat treatment cycle and tempering at 825° C. for 35 hours has a positive value of not greater than $1.6 \times 10^{-7}/°K$.;
   c) the transmission of the glass ceramic in the IR region between 800 nm and 2.6 microns can be variably adjusted; and
   d) the glass ceramic consists essentially of the following base glass composition (in weight percent):

| | |
|---|---|
| $SiO_2$ | 62–68 |
| $Al_2O_3$ | 19.5–22.5 |
| $Li_2O$ | 3.0–4.0 |
| $Na_2O$ | 0–1.0 |
| $K_2O$ | 0–1.0 |
| $Na_2O + K_2O$ | 0.5–1.5 |
| BaO | 1.5–3.5 |
| CaO | 0–1.0 |
| BaO + CaO | 1.5–4.0 |
| MgO | 0–0.5 |
| ZnO | 0.5–2.5 |
| $TiO_2$ | 2.0–2.8 |
| $ZrO_2$ | 0.0–3.0 |
| $TiO_2 + ZrO_2$ | 3.5–5.5 |
| $MnO_2$ | 0.0–0.40 |
| $Fe_2O_3$ | 0.0–0.20 |
| CoO | 0.0–0.30 |
| NiO | 0.0–0.30 |
| $V_2O_5$ | 0.0–0.80 |
| $Cr_2O_3$ | 0.0–0.20 |
| F | 0.0–0.20 |
| $Sb_2O_3$ | 0.5–2.0 | and wherein it was transformed from this glass-ceramic base glass by a heat treatment between 680° C. and 920° C.

2. A glass ceramic according to claim 1, consisting essentially of the following base glass composition:

| | |
|---|---|
| $SiO_2$ | 64–66 |
| $Al_2O_3$ | 21–22 |
| $Li_2O$ | 3.4–3.8 |
| $Na_2O$ | 0.6–0.8 |
| $K_2O$ | 0.0–0.3 |
| $Na_2O + K_2O$ | 0.7–1.1 |
| BaO | 2.0–2.8 |
| CaO | 0.0–0.2 |
| BaO + CaO | 2.0–3.0 |
| MgO | 0.0–0.2 |
| ZnO | 1.0–1.6 |
| $TiO_2$ | 2.0–2.8 |
| $ZrO_2$ | 1.0–1.8 |
| $TiO_2 + ZrO_2$ | 3.5–4.6 |
| $MnO_2$ | 0.0–0.15 |
| $Fe_2O_3$ | 0.0–0.15 |
| CoO | 0.0–0.30 |
| NiO | 0.0–0.30 |
| $V_2O_5$ | 0.0–0.60 |
| $Sb_2O_3$ | 0.8–1.6 |
| $As_2O_3$ | 0.8–1.6 |

3. A glass ceramic according to claim 1, consisting essentially of the following base glass composition:

| | |
|---|---|
| $SiO_2$ | 64.50 |
| $Al_2O_3$ | 21.40 |
| $Li_2O$ | 3.60 |
| $Na_2O$ | 0.60 |
| $K_2O$ | 0.15 |
| BaO | 2.30 |
| ZnO | 1.20 |
| $TiO_2$ | 2.30 |
| $ZrO_2$ | 1.60 |
| $MnO_2$ | 0.17 |
| $Fe_2O_3$ | 0.18 |
| CoO | 0.23 |
| NiO | 0.29 |
| $Sb_2O_3$ | 1.50 |

4. A glass ceramic according to claim 1, consisting essentially of the following base glass composition:

| | |
|---|---|
| $SiO_2$ | 65.20 |
| $Al_2O_3$ | 21.20 |
| $Li_2O$ | 3.70 |
| $Na_2O$ | 0.60 |
| $K_2O$ | 0.20 |
| BaO | 2.30 |
| ZnO | 1.50 |
| $TiO_2$ | 2.30 |
| $ZrO_2$ | 1.45 |
| $MnO_2$ | 0.15 |
| $Fe_2O_3$ | 0.09 |
| CoO | 0.12 |
| NiO | 0.15 |
| $V_2O_5$ | 0.15 |
| $Sb_2O_3$ | 1.00 |

5. A glass ceramic according to claim 1, consisting essentially of the following base glass composition:

| | |
|---|---|
| $SiO_2$ | 65.40 |
| $Al_2O_3$ | 21.10 |
| $Li_2O$ | 3.50 |
| $Na_2O$ | 0.80 |
| $K_2O$ | 0.25 |
| BaO | 2.35 |
| ZnO | 1.30 |
| $TiO_2$ | 2.25 |
| $ZrO_2$ | 1.58 |
| $MnO_2$ | 0.08 |
| $Fe_2O_3$ | 0.04 |
| CoO | 0.07 |
| NiO | 0.10 |
| $V_2O_5$ | 0.45 |
| $Sb_2O_3$ | 1.00 |

6. A glass ceramic according to claim 1, consisting essentially of the following base glass composition:

| | |
|---|---|
| $SiO_2$ | 64.90 |
| $Al_2O_3$ | 21.80 |
| $Li_2O$ | 3.50 |
| $Na_2O$ | 0.75 |
| $K_2O$ | 0.05 |
| BaO | 2.40 |
| ZnO | 1.20 |
| $TiO_2$ | 2.40 |
| $ZrO_2$ | 1.60 |
| $MnO_2$ | 0.08 |
| $Fe_2O_3$ | 0.06 |
| CoO | 0.07 |
| NiO | 0.09 |
| $V_2O_5$ | 0.25 |
| $Sb_2O_3$ | 1.10 |

7. A glass ceramic according to claim 1, consisting essentially of the following base glass composition:

| | |
|---|---|
| $SiO_2$ | 65.30 |
| $Al_2O_3$ | 21.20 |
| $Li_2O$ | 3.70 |
| $Na_2O$ | 0.60 |
| $K_2O$ | 0.20 |
| BaO | 2.30 |
| ZnO | 1.45 |
| $TiO_2$ | 2.30 |
| $ZrO_2$ | 1.45 |
| $MnO_2$ | 0.03 |
| $Fe_2O_3$ | 0.05 |
| CoO | 0.05 |
| NiO | 0.04 |
| $V_2O_5$ | 0.30 |
| $Sb_2O_3$ | 1.00 |

8. A glass ceramic according to claim 1, consisting essentially of the following base glass composition:

| | |
|---|---|
| $SiO_2$ | 65.00 |
| $Al_2O_3$ | 21.40 |
| $Li_2O$ | 3.60 |
| $Na_2O$ | 0.70 |
| $K_2O$ | 0.25 |
| BaO | 2.35 |
| ZnO | 1.30 |
| $TiO_2$ | 2.20 |
| $ZrO_2$ | 1.60 |
| $Fe_2O_3$ | 0.03 |

-continued

| | |
|---|---|
| $V_2O_5$ | 0.40 |
| $Sb_2O_3$ | 1.20 |

9. In a cooking system having a cooktop panel for heat exchange between a heat source and a material being cooked, the improvement wherein the cooktop panel consists essentially of a glass ceramic composition according to claim 1.

10. A cooking system according to claim 9 in the form of a heatable plate.

11. A composition according to claim 1 having a linear thermal expansion coefficient of $-2.7 \times 10^{-7}/°K.$ to $+0.1 \times 10^{-7}/°K.$ 12. A composition according to claim 1, further comprising a compound selected from the group consisting of $MnO_2$, $Fe_2O_3$, CaO, NiO, $V_2O_5$ and $Cr_2O_3$ in an amount sufficient to impart a blank appearance in reflection and a violet or brown to dark red appearance in transmission.

13. A transparent, colored glass ceramic consisting essentially of high quartz solid solution crystals, especially suitable for the manufacture of heatable plates, wherein:
  a) the change in the linear thermal expansion coefficient has a positive value of not greater than $1.8 \times 10^{-7}/°K.$ over one to four heat treatment cycles of i) heating from room temperature at 4° C./min to 720° C.; ii) maintaining the temperature at 720° C. for one hour, iii) heating at 2° C./min to 880° C., iv) maintaining the temperature at 880° C. for 90 min, and v) cooling to room temperature;
  b) the change in the linear thermal expansion coefficient after one heat treatment cycle and tempering at 825° C. for 35 hours has a positive value of not greater than $1.6 \times 10^{-7}/°K.$;
  c) the transmission of the glass ceramic in the IR region between 800 nm and 2.6 microns can be variably adjusted; and
  d) the glass ceramic consists essentially of the following base glass composition (in weight percent):

| | |
|---|---|
| $SiO_2$ | 62–68 |
| $Al_2O_3$ | 19.5–22.5 |
| $Li_2O$ | 3.0–4.0 |
| $Na_2O$ | 0–1.0 |
| $K_2O$ | 0–1.0 |
| $Na_2O + K_2O$ | 0.5–1.5 |
| BaO | 1.5–3.5 |
| CaO | 0–1.0 |
| BaO + CaO | 1.5–4.0 |
| MgO | 0–0.5 |
| ZnO | 0.5–2.5 |
| $TiO_2$ | 1.5–5.0 |
| $ZrO_2$ | 0.0–3.0 |
| $TiO_2 + ZrO_2$ | 3.5–5.5 |
| $MnO_2$ | 0.0–0.40 |
| $Fe_2O_3$ | 0.0–0.20 |
| CoO | 0.0–0.30 |
| NiO | 0.0–0.30 |
| $V_2O_5$ | 0.0–0.80 |
| $Cr_2O_3$ | 0.0–0.20 |
| F | 0.0–0.20 |
| $Sb_2O_3$ | 0.5–2.0 | and wherein it was transformed from this glass-ceramic base glass by a heat treatment between 680° C. and 920° C.

* * * * *